(12) United States Patent
Rider et al.

(10) Patent No.: US 10,851,196 B2
(45) Date of Patent: Dec. 1, 2020

(54) RIGID POLYURETHANE FOAMS SUITABLE FOR USE AS PANEL INSULATION

(71) Applicant: Covestro LLC, Pittsburgh, PA (US)

(72) Inventors: Shawn G. Rider, Harrisville, PA (US); Brandon W. Parks, McKees Rocks, PA (US); Carson C. Miller, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 16/396,864

(22) Filed: Apr. 29, 2019

(65) Prior Publication Data
US 2020/0339733 A1 Oct. 29, 2020

(51) Int. Cl.
| | | |
|---|---|---|
| C08G 18/48 | (2006.01) | |
| C08G 18/50 | (2006.01) | |
| C08G 18/20 | (2006.01) | |
| C08G 18/18 | (2006.01) | |
| C08G 18/76 | (2006.01) | |
| C08J 9/08 | (2006.01) | |
| C08J 9/14 | (2006.01) | |
| F25D 23/06 | (2006.01) | |
| B32B 15/04 | (2006.01) | |
| B32B 15/20 | (2006.01) | |
| B32B 5/18 | (2006.01) | |
| C08G 101/00 | (2006.01) | |

(52) U.S. Cl.
CPC .......... C08G 18/482 (2013.01); B32B 5/18 (2013.01); B32B 15/046 (2013.01); B32B 15/20 (2013.01); C08G 18/1875 (2013.01); C08G 18/2018 (2013.01); C08G 18/2027 (2013.01); C08G 18/2081 (2013.01); C08G 18/4825 (2013.01); C08G 18/4883 (2013.01); C08G 18/5024 (2013.01); C08G 18/7664 (2013.01); C08J 9/08 (2013.01); C08J 9/144 (2013.01); F25D 23/06 (2013.01); B32B 2266/0278 (2013.01); B32B 2266/08 (2013.01); B32B 2307/304 (2013.01); B32B 2605/08 (2013.01); C08G 2101/0025 (2013.01); C08J 2201/022 (2013.01); C08J 2203/02 (2013.01); C08J 2203/142 (2013.01); C08J 2203/184 (2013.01); C08J 2205/10 (2013.01); C08J 2375/12 (2013.01); F25D 2201/126 (2013.01)

(58) Field of Classification Search
None
See application file for complete search history.

(56) References Cited

U.S. PATENT DOCUMENTS

| | | | |
|---|---|---|---|
| 3,161,682 A | 12/1964 | Lesesne et al. | |
| 4,094,846 A | 6/1978 | DeLapp | |
| 5,686,500 A * | 11/1997 | Fishback | C08G 18/165 521/128 |
| 5,690,855 A | 11/1997 | Nichols et al. | |
| 9,051,442 B2 | 6/2015 | Williams et al. | |
| 9,453,115 B2 | 9/2016 | Williams et al. | |
| 9,550,854 B2 | 1/2017 | Van Der Puy et al. | |
| 9,556,303 B2 | 1/2017 | Ross et al. | |
| 9,587,080 B2 | 3/2017 | Singh et al. | |
| 2005/0208005 A1 | 9/2005 | Giroud | |
| 2007/0173556 A1 | 7/2007 | Prange et al. | |
| 2011/0263737 A1* | 10/2011 | Fricke | C08J 9/141 521/128 |
| 2012/0172476 A1 | 7/2012 | Costa et al. | |
| 2012/0202904 A1 | 8/2012 | Chen et al. | |
| 2013/0041048 A1 | 2/2013 | Chen et al. | |
| 2014/0005288 A1 | 1/2014 | Chen et al. | |
| 2014/0051776 A1 | 2/2014 | Chen et al. | |
| 2014/0364528 A1* | 12/2014 | Rexrode | C08G 18/14 521/177 |
| 2014/0371338 A1 | 12/2014 | Chen et al. | |
| 2015/0197614 A1 | 7/2015 | Chen et al. | |
| 2016/0130416 A1 | 5/2016 | Chen et al. | |
| 2017/0081491 A1 | 3/2017 | Chen et al. | |
| 2017/0158801 A1 | 6/2017 | Rider et al. | |
| 2018/0134861 A1 | 5/2018 | Schilling | |

FOREIGN PATENT DOCUMENTS

| | | |
|---|---|---|
| EP | 0091828 A1 | 10/1983 |
| WO | 2012105657 A1 | 8/2012 |
| WO | 2013081809 A1 | 6/2013 |

OTHER PUBLICATIONS

G. Oertel, Polyurethane Handbook, 2nd Edition, 1994, pp. 253-256, Hanser/Gardner Publications Inc., Cincinnati.
The Dow Chemical Company, Dow Answer Center, Answer ID 5659 updated Jul. 25, 2017.
U.S. Appl. No. 15/961,270, filed Apr. 24, 2018, Shawn G. Rider et al, entitled Rigid Polyurethane Foams Suitable for use as Panel Insulation.
U.S. Appl. No. 15/834,709, filed Dec. 7, 2017, Rick L. Adkins et al. entitled Amine Based Polymer Poloyol Stabilizers.
U.S. Appl. No. 15/961,328, filed Apr. 24, 2018, Shawn G. Rider et al. entitled Rigid Polyurethane Foams Suitable for Use as Panel Insulation.
U.S. Appl. No. 16/296,872, filed Mar. 8, 2019, Brandon W. Parks, entitled HCFO-Containing Isocyanate-Reactive Compositions, Related Foam-Forming Compositions and PUR-PIR Foams.

* cited by examiner

Primary Examiner — Chinessa T. Golden
(74) Attorney, Agent, or Firm — Donald R. Palladino

(57) ABSTRACT

Disclosed are polyurethane-foam forming compositions, rigid polyurethane foams and methods for their production, as well as to composite articles comprising such foams sandwiched between facer substrates, including use of such composite elements for floor insulating elements for refrigerated tractor trailers. The rigid polyurethane foams are produced from an isocyanate-reactive composition comprising: (1) a polyol blend; (2) a hydrochlorofluoroolefin; and (3) a tertiary amine catalyst composition.

20 Claims, No Drawings

RIGID POLYURETHANE FOAMS SUITABLE FOR USE AS PANEL INSULATION

FIELD

This specification pertains generally to rigid polyurethane foam-forming compositions, rigid polyurethane foams, and methods for their production, as well as to composite articles comprising such foams sandwiched between facer substrates, including use of such composite elements for floor insulating elements for refrigerated tractor trailers. The rigid polyurethane foams are produced from an isocyanate-reactive composition comprising: (1) a polyol blend; (2) a hydrochlorofluoroolefin ("HCFO"); and (3) a tertiary amine catalyst composition.

BACKGROUND

Rigid polyurethane foams are used in numerous industries. They are produced by reacting an appropriate polyisocyanate and an isocyanate-reactive compound, usually a polyol, in the presence of a blowing agent. One use of such foams is as a thermal insulation medium in the construction of refrigerated storage devices. The thermal insulating properties of closed-cell rigid foams are dependent upon a number of factors, including the average cell size and the thermal conductivity of the contents of the cells. Chlorofluorocarbons ("CFCs") were typically used as blowing agents to produce these foams because of their exceptionally low vapor thermal conductivity. However, CFCs are now known to contribute to the depletion of ozone in the stratosphere and, as a result, mandates have been issued which prohibit their use.

Initially, the most promising alternatives to CFC's appeared to be hydrogen-containing chlorofluorocarbons ("HCFCs"). While HCFCs, such as HCFC 141b, have been used as alternatives to CFCs, they have also been found to have some ozone-depletion potential. There is, therefore, a desire to find substitutes for HCFCs as well as CFCs.

Alternative blowing agents, such as hydrofluorocarbons ("HFCs"), also replaced CFCs. The compounds are, however, greenhouse gases. Hydrocarbons, such as pentane isomers, have also been used but these are flammable and have lower energy efficiency. Halogenated hydroolefinic compounds, such as HCFOs, are possible candidates as replacements for HFCs, since their chemical instability in the lower atmosphere provides for a low global warming potential and zero or near zero ozone depletion.

A drawback to some HCFOs as blowing agents in the production of satisfactory isocyanate-based foams, however, is shelf-life issues. Blowing agents usually are combined with polyols and other components, such as surfactant(s) and catalyst(s) to form a so-called "B-side" pre-mix that may be stored for up to several months prior to being combined with an "A-side" isocyanate component to form the foam. A drawback of systems that use certain HCFOs is the shelf-life of the B-side composition. If the B-side composition is aged prior to combining with the polyisocyanate, the foam can be of lower quality and may even collapse during formation. The poor foam structure is thought to be attributable to the reaction of certain catalysts with these HCFOs which results in the partial decomposition of the blowing agent and, as a result, undesirable modification of silicone surfactants, resulting in poor foam structure and quality.

Foam-forming compositions used in the production of discontinuous panel insulation, such as insulation for refrigerated trailer floors, must exhibit a stringent combination of properties. For example, in addition to good thermal insulation properties, they must exhibit a target gel time conducive to the manufacturing equipment and process that is used, and they must exhibit a long shelf life, which means that this gel time cannot change by a large amount after storage of the foam-forming composition components for a long period of time (several months or more), even when water is used as a blowing agent component in an amount of 2% by weight or more, based on the total weight of the isocyanate-reactive composition. They also must exhibit good dimensional stability (low foam shrinkage) even when the free-rise foams have a relatively low density of 1.4 to 1.7 lb/ft$^3$ (22.4 to 27.2 kg/m$^3$) In addition, it is important that the foam adheres well to facer substrates typically used in refrigerated trailer floor applications, such as aluminum. Moreover, since the trailer floor part is often foamed without a press, it can be important that the foam does not generate high pressure during foaming. Finally, it can be important that the foam exhibits low friability, i.e., low tendency to easily crumble or break into small pieces, while maintaining good dimensional stability (dimensional stability normally improves as the system functionality increases, but typically this occurs at the expense of increased friability). Reducing foam friability can improve foam adhesion to facer substrates which can permit earlier demolding, thereby increasing productivity.

A composition that can fulfill most, if not all, of these requirements, while utilizing a HCFO blowing agent would, therefore, before highly desirable.

SUMMARY

In certain respects, the present disclosure is directed to isocyanate-reactive compositions. These isocyanate-reactive compositions comprise: (a) a polyol blend; (b) a blowing agent composition; and (c) a tertiary amine catalyst composition. The polyol blend comprises: (1) 30 to 98% by weight, based on the total weight of the polyol blend, of a saccharide-initiated polyether polyol having an OH number of 200 to 600 mg KOH/g and a functionality of 4 to 6, (2) 1 to 40% by weight, based on the total weight of the polyol blend, of a polyalkylene oxide glycol having a functionality of 1.9 to 2.0 and an OH number of 20 to 120 mg KOH/g; and (3) 1 to 20% by weight, based on the total weight of the polyol blend, of an alkanolamine-initiated polyether polyol having an OH number of at least 500 mg KOH/g and a functionality of 2.5 to 4. The blowing agent composition comprises: (1) a HCFO; and (2) a carbon dioxide generating chemical blowing agent.

The present specification is also directed to rigid polyurethane foams produced from such compositions, methods for making such rigid foams, composite articles comprising such rigid foams, refrigerated trailers that include such a composite element as floor insulation, as well as to related foam-forming compositions.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the polyol or polyol blend that is being described. In the production of polyurethane foams, the hydroxyl groups react with isocyanate groups, —NCO, that are attached to a polyisocyanate. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol— Equivalent Weight (g/eq)=(56.1×1000)/OH number.

As indicated, certain embodiments of the present specification are directed to producing rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part II Technology," J. H. Saunders & K. C. Frisch, Interscience Publishers, 1964, page 239.

In some implementations, this specification is directed to isocyanate-reactive compositions that comprise a polyol blend. More particularly, in certain embodiments, the polyol blend comprises 30 to 98% by weight, such as 40 to 98% by weight, 50 to 98% by weight, 60 to 90% by weight, or, in some cases, 70 to 90% by weight, based on the total weight of the polyol blend, of a saccharide-initiated polyether polyol having an OH number of 200 to 600 mg KOH/g and a functionality of 4 to 6.

As used herein, "saccharide-initiated polyether polyol" refers to a polyether polyol prepared by reacting at least one alkylene oxide with one or more suitable initiator compounds in the presence of a suitable catalyst, in which the initiator compounds comprise one or more saccharides. Examples of suitable alkylene oxides include ethylene oxide, propylene oxide, butylene oxide, styrene oxide, epichlorohydrin, or mixtures thereof, etc. Some examples of suitable saccharide initiators are sucrose, sorbitol, maltitol, and mixtures thereof, as well as other mono-saccharides, di-saccharides, tri-saccharides and polysaccharides. Other initiator compounds are often used in combination with the saccharide initiator to prepare the saccharide-initiated polyether polyol. Saccharides can be co-initiated with for example, compounds such as water, propylene glycol, glycerin, ethylene glycol, ethanol amines, diethylene glycol, and mixtures thereof, to form a saccharide-initiated polyether polyol. As will be appreciated, it is possible to use a wide variety of individual initiator compounds in combination with one another in which the functionality of the individual initiator compounds does not fall within the functionalities set forth herein, provided that the average functionality of the mixture of initiator compounds satisfies the overall functionality range disclosed herein.

Some examples of suitable catalysts which can be used include basic catalysts (such as sodium or potassium hydroxide or tertiary amines such as methyl imidazole), and double metal cyanide (DMC) catalysts.

In some embodiments, the saccharide-initiated polyether polyol has an OH number of 200 to 600 mg KOH/g, such as 300 to 550 mg KOH/g, such as 350 to 450 mg KOH/g, or, in some cases, 360 to 400 mg KOH/g, and a functionality of 4 to 6, such as 4 to 5, or 4.0 to 4.5.

As previously indicated, implementations of the polyol blend included in the isocyanate-reactive compositions of this specification further comprise 1 to 40% by weight, such as 1 to 20% by weight, or, in some cases, 10 to 20% by weight, based on the total weight of the polyol blend, of a polyalkylene oxide glycol having a functionality of 1.9 to 2.0, such as 1.98 to 2.00, and an OH number of 20 to 120 mg KOH/g, such as 20 to 80 mg KOH/g, 20 to 40 mg KOH/g or 20 to 30 mg KOH/g. Such polyalkylene oxide glycols may also have a number average molecular weight of, for example, 1000 to 5600 g/mol, such as 2800 to 5600 g/mol or 3700 to 5600 g/mol.

Suitable polyalkylene oxide glycols include products that can be obtained by addition polymerization of one or more alkylene oxides such as ethylene oxide, propylene oxide, butylene oxide and the like to one or more glycols, such as ethylene glycol, diethylene glycol, propylene glycol, and other oligomers of ethylene glycol and/or propylene glycol. In some embodiments, the alkylene oxide comprises, or in some cases, consists of, propylene oxide and/or ethylene oxide, and/or the glycol comprises, or, in some cases, consists of, propylene glycol.

In some embodiments, the polyalkylene, such as polypropylene, oxide glycols are produced using a double metal cyanide catalyst (DMC catalyst) instead of the conventional potassium hydroxide, and consequently, in some cases, may exhibit a greater OH-functionality and lower monol content than those produced using potassium hydroxide as catalyst.

Such polyether polyols can be produced by polymerizing propylene oxide in the presence of a DMC catalyst, such as zinc hexacyano-cobaltate, at 130° C., for example, using the process described in WO 97/29,146 (Examples 1 to 5) with incremental addition of initiator.

In some implementations, the saccharide-initiated polyether polyol described above and the polyalkylene oxide glycol described above are present in the polyol blend at a weight ratio of at least 2:1, such as 2:1 to 10:1, 3:1 to 7:1 or 4:1 to 6:1.

As indicated earlier, the polyol blend of the isocyanate-reactive compositions of this specification comprises an alkanolamine-initiated polyether polyol. As used herein, "alkanolamine-initiated polyether polyol" refers to a polyether polyol prepared by reacting at least one alkylene oxide with one or more suitable initiator compounds in the presence of a suitable catalyst, in which the initiator compounds comprise one or more alkanolamines. Suitable catalysts including basic catalysts (such as sodium or potassium hydroxide or tertiary amines such as methyl imidazole) and DMC catalysts. In the polyol blends described herein, each of the recited polyether polyols, including the "alkanolamine-initiated polyether polyol" and the "aliphatic amine-initiated polyether polyol", are different from each other.

As used herein, the term "alkanolamine" refers to compounds represented by the formula:

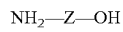

in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms. The dialkylene ether radical may be represented by the formula:

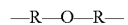

where each R represents a hydrocarbon radical having 2 to 3 carbon atoms.

Specific examples of suitable alkanolamines that may be used in the preparation of the alkanolamine-initiated polyether polyol include monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, as well as mixtures of any two or more thereof.

To prepare the alkanolamine-initiated polyether polyol, the alkanolamine is reacted with an alkylene oxide. Suitable alkylene oxides include ethylene oxide, propylene oxide, butylene oxide, styrene oxide, and epichlorohydrin, as well as mixtures of any two or more thereof.

In some implementations, the alkanolamine-initiated polyether polyol has an OH number of at least 500 mg KOH/g, such as 500 to 900 mg KOH/g, 600 to 800 mg KOH/g, or, in some cases, 680 to 720 mg KOH/g, and a functionality of 2.5 to 4, such as 2.5 to 3.5.

In some implementations, the alkanolamine-initiated polyether polyol is utilized in an amount of 1 to 20%, such as 1 to 10% by weight or 2 to 10% by weight, based upon the total weight of the polyol blend.

In some implementations, the saccharide-initiated polyether polyol described above, and the alkanolamine-initiated polyether polyol are present in the polyol blend at a weight ratio of at least 5:1, such as 10:1 to 25:1, or 15:1 to 25:1. In certain embodiments, the polyalkylene oxide glycol and the alkanolamine-initiated polyether polyol are present in the polyol blend in a weight ratio of at least 1:1, such as 1:1 to 10:1, 1:1 to 5:1, or, in some cases 2:1 to 4:1.

It was discovered, surprisingly, that inclusion of the alkanolamine-initiated polyether polyol in the isocyanate-reactive compositions described in this specification, in an amount within the ranges described above, enabled the production of shelf-life stable isocyanate-reactive compositions that can produce rigid polyurethane foams with greatly reduced friability (resulting in greatly improved facer adhesion) as compared to foams produced by a similar isocyanate-reactive composition that does not include such an alkanolamine-initiated polyether polyol. This improved facer adhesion, it is currently believed, allows for quicker demolding, thereby increasing productivity.

If desired, the polyol blend may include additional compounds that contain isocyanate-reactive groups. For example, in some implementations, the polyol blend may further comprise an aliphatic triol-initiated polyether polyol having an OH number of 100 to 500 mg KOH/g, such as 200 to 400 mg KOH/g, 200 to 300 mg KOH/g, 200 to 250 mg KOH/g, 230 to 250 mg KOH/g or 233 to 243 mg KOH/g, and a functionality of greater than 2 to 4, such as 2.5 to 3.5, or, in some cases, 3.0.

Such polyether polyols can be prepared by reacting suitable aliphatic divalent, trivalent and/or more valent alcohols, (e.g., ethanediol, propanediol-1,2 and propanediol-1,3, diethylene glycol, dipropylene glycol, butanediol-1,4, hexanediol-1,6, and glycerin), provided that at least one aliphatic trivalent alcohol (such as glycerin) is used. In some embodiments, the polyvalent alcohol initiator comprises or, in some cases, consists of glycerin and the alkylene oxide comprises, or, in some cases, consists of propylene oxide.

The polyol blend may, if desired, include other compound with isocyanate-reactive groups, such as chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, and diethyltoluenediamine. Polyester polyols may be prepared from, for example, an organic dicarboxylic acid having 2 to 12 carbon atoms, such as an aliphatic dicarboxylic acid having 4 to 6 carbon atoms, and a polyvalent alcohol, such as a diol or triol having 2 to 12 carbon atoms. Examples of the dicarboxylic acid are succinic acid, glutaric acid, adipic acid, suberic acid, azelaic acid, sebacic acid, decanedicarboxylic acid, maleic acid, fumaric acid, phthalic acid, isophthalic acid and terephthalic acid. Instead of a free dicarboxylic acid, a corresponding dicarboxylic acid derivative such as a dicarboxylic acid monoester or diester prepared by esterification with an alcohol having 1 to 4 carbon atoms or dicarboxylic anhydride can be used.

In certain embodiments, the polyol blend has a weighted average functionality of from 4 to 6, such as 4.5 to 4.5 or 4.5 to 5.0, and/or a weighted average hydroxyl number of 300 to 500 mg KOH/g, such as 300 to 400 mg KOH/g, or 320 to 360 mg KOH/g, and/or a weighted average molecular weight of greater than 800 to 1600 g/mol, such as 1000 to 1400 g/mol or 1200 to 1300 g/mol.

As indicated, the isocyanate-reactive composition of this specification further comprises a blowing agent composition. The blowing agent composition comprises: (1) a physical blowing agent comprising a HCFO; and (2) a carbon dioxide generating chemical blowing agent.

Suitable HCFOs include 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers). In some implementations, the boiling point, at atmospheric pressure, of the HCFO is at least −25° C., at least −20° C., or, in some cases, at least −19° C., and 40° C. or less, such as 35° C. or less, or, in some cases 33° C. or less. The HCFO may have a boiling point, at atmospheric pressure, of, for example, −25° C. to 40° C., or −20° C. to 35° C., or −19° C. to 33° C.

In some implementations, the HCFO is utilized in an amount of at least 10% by weight, such as 10 to 30% by weight or 10 to 20% by weight, based on the total weight of the isocyanate-reactive composition.

In certain implementations, the isocyanate-reactive composition comprises one or more other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane). In other embodiments, the isocyanate-reactive composition is substantially or, in some cases, completely free, of other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane). As used herein, the term "substantially free" when used with reference to these blowing agents, means that the blowing agent is present, if at all, in an amount of less than 10% by weight, such as less than 1% by weight, based on the total weight of the blowing agent composition.

As indicated above, the isocyanate-reactive composition comprises a carbon dioxide generating chemical blowing agent, such as water and/or a formate-blocked amine.

In some of these implementations, the carbon dioxide generating chemical blowing agent, such as water, is utilized in an amount of 0.5 to 5.0% by weight, such as 1 to 4% by weight, or 1.0 to 3.0% by weight, or 2.0 to 3.0% by weight, based on the total weight of the isocyanate-reactive composition.

In certain implementations, the blowing agent composition comprises HCFO and a carbon dioxide generating chemical blowing agent, such as water, wherein the HCFO and the carbon dioxide generating chemical blowing agent are present in an amount of at least 90% by weight, such as at least 95% by weight, or, in some cases, at least 99% by weight, based on the total weight of the blowing agent composition. In certain implementations, the HCFO and a carbon dioxide generating chemical blowing agent are present in the blowing agent composition at a weight ratio of at least 2:1, such as at least 4:1, such as 4:1 to 10:1 or 6:1 to 10:1.

If desired, the blowing agent composition may include other physical blowing agents, such as (a) other hydrofluoroolefins (HFOs), such as pentafluoropropane, tetrafluoropropene, 2,3,3,3-tetrafluoropropene, 1,2,3,3-tetrafluoropropene, trifluoropropene, tetrafluorobutene, pentafluorobutene, hexafluorobutene, heptafluorobutene, heptafluoropentene, octafluoropentene, and nonafluoropentene; (b) hydrofluorocarbons (c) hydrocarbons, such as any of the pentane isomers and butane isomers; (d) hydrofluoroethers (HFEs); (e) $C_1$ to $C_5$ alcohols, $C_1$ to $C_4$ aldehydes, $C_1$ to $C_4$ ketones, $C_1$ to $C_4$ ethers and carbon dioxide. Specific examples of such blowing agents are described in United States Patent Application Publication No. US 2014/0371338 A1 at [0051] and [0053], the cited portion of which being incorporated herein by reference.

In some implementations, the isocyanate-reactive composition also comprises a surfactant. Any suitable surfactant can be used including organosilicon compounds, such as polysiloxane-polyalkyene-block copolymers, such as a polyether-modified polysiloxane. Other useful surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some embodiments, surfactant is utilized in an amount of 0.2 to 5.0% by weight, such as 1 to 3% by weight, based on the total weight of the isocyanate-reactive composition.

As previously indicated, the isocyanate-reactive composition further comprises a tertiary amine catalyst composition. As will be appreciated, tertiary amine catalysts are known as "blow catalysts" since they have a greater effect on the water-polyisocyanate blowing reaction. In some implementations, tertiary amine catalyst comprises a morpholine and/or an imidazole. Moreover, in some implementations, the tertiary amine catalyst composition comprises: (i) 80 to 99% by weight, such as 90 to 99% by weight, or, in some cases, 95 to 98% by weight or 97 to 98% by weight, based on the total weight of the tertiary amine catalyst composition, of a morpholine; and (ii) 1 to 20% by weight, such as 1 to 10% by weight, or, in some cases, 2 to 5% by weight or 2 to 3% by weight, based on the total weight of the tertiary amine catalyst composition, of an imidazole.

Suitable morpholine catalysts include, for example, dimorpholinodiethylether, dimorpholinodimethylether, N-ethylmorpholine, and N-methylmorpholine. Suitable imidazole catalysts include, for example, imidazole, n-methylimidazole, and 1,2-dimethylimidazole. In some embodiments, the morpholine catalyst comprises a mixture of two or more morpholine catalyst, such as a mixture of dimorpholinodiethylether and N-methylmorpholine wherein, for example, the dimorpholinodiethylether is utilized in an amount of 30 to 80% by weight, such as 40 to 80% by weight, and N-methylmorpholine is utilized in an amount of 20 to 70% by weight, such as 20 to 60% by weight, based on the total weight of morpholine catalyst utilized.

In certain embodiments, the tertiary amine catalyst composition does not include an acid-blocked amine catalyst. In certain embodiments, the isocyanate-reactive composition does not include a metal catalyst and/or any other catalyst that is not a tertiary amine catalyst.

In certain embodiments, the total amount of tertiary amine catalyst utilized in the isocyanate-reactive composition is 1 to 5% by weight, such as 1.0 to 3.0% or 1.5 to 2.5% by weight, based on the total weight of the isocyanate-reactive composition.

Additional materials which may optionally be included in the foam-forming compositions of the present invention include: pigments, colorants, fillers, antioxidants, flame retardants, and stabilizers. Exemplary flame retardants useful in the foam-forming composition of the present invention include, but are not limited to, reactive bromine based compounds and chlorinated phosphate esters, including but not limited to, tri(2-chloroethyl)phosphate (TECP), tri(1,3-dichloro-2-propyl)phosphate, tri(1-chloro-2-propyl)phosphate (TCPP) and dimethyl propyl phosphate (DMPP).

As will be appreciated, other embodiments of this specification are directed to rigid polyurethane-foam forming compositions that comprise: (a) a diisocyanate and/or polyisocyanate (collectively "polyisocyanate"); and (b) an isocyanate-reactive composition of the type described above.

Any of the known organic polyisocyanates, modified polyisocyanates or isocyanate-terminated prepolymers made from any of the known organic isocyanates may be used. Suitable organic isocyanates include aromatic, aliphatic, and cycloaliphatic polyisocyanates and combinations thereof. Useful polyisocyanates include: diisocyanates, such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified polyisocyanates are obtained by chemical reaction of polyisocyanates. Useful modified polyisocyanates include, but are not limited to, those containing ester groups, urea groups, biuret groups, allophanate groups, carbodiimide groups, isocyanurate groups, uretdione groups and/or urethane groups. Examples of modified polyisocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain embodiments, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent, due to their ability to cross-link the polyurethane.

The present specification is also directed to processes for producing rigid polyurethane foams. In such processes, an organic polyisocyanate is reacted with an isocyanate-reactive composition of the type described above. In some embodiments, the isocyanate functional component and the isocyanate-reactive composition are mixed at an isocyanate index of from 90 to 140, such as 110 to 130.

In certain embodiments, the polyol blend of the isocyanate-reactive composition is reacted with an organic polyisocyanate in the presence of a blowing agent, water, a tertiary amine catalyst composition, a surfactant and any other optional ingredients. The rigid foams may be prepared by blending all of the components of the isocyanate-reactive composition together in a phase stable mixture, and then mixing this in the proper ratio with the organic polyisocyanate. Alternatively, one or more of the components, such as the surfactant, may be combined with the organic polyisocyanate prior to mixing it with the isocyanate-reactive composition. Other possible embodiments of the invention would include adding one or more of the components as a separate stream, together with the polyol blend and the organic polyisocyanate.

Many foam machines are designed to condition and mix only two components in the proper ratio. For use of these machines, a premix of all the components except the polyisocyanate can be advantageously employed. According to the two-component method (component A: polyisocyanate; and component B: isocyanate-reactive composition which typically includes the polyol blend, blowing agent, water, catalyst and surfactant), the components may be mixed in the proper ratio at a temperature of 5 to 50° C., such as 15 to 35° C., injected or poured into a mold having the temperature controlled to within a range of 20 to 70° C., such as 35 to 60° C. The mixture then expands to fill the cavity with the rigid polyurethane foam. This simplifies the metering and mixing of the reacting components which form the polyurethane foam-forming mixture, but requires that the isocyanate-reactive composition be phase stable.

Furthermore, the rigid polyurethane foam can be prepared in a batch or continuous process by the one-shot or quasi-prepolymer methods using any well-known foaming apparatus. The rigid polyurethane foam may be produced in the form of slab stock, moldings, cavity fillings, sprayed foam, frothed foam or laminates with other materials such as hardboard, plasterboard, plastics, paper or metal as facer substrates.

For closed-cell insulating foams, the object is to retain the blowing agent in the cells to maintain a low thermal conductivity of the insulating material, i.e., the rigid polyurethane foam. Thus, a high closed-cell content in the foam is desirable. Foams produced according to embodiments of the present specification have more than 80 percent, typically more than 85 percent, or more than 88 percent closed-cell content as measured according to ASTM D6226-15. Furthermore, the thermal conductivity of foams produced according to various embodiments of the present specification, measured at 35° F. (2° C.), is less than 0.160 BTU-in/h-ft$^2$-° F. for foam from the core of 3-inch thick panels, as measured according to ASTM C518-17.

This specification also relates to the use of the rigid polyurethane foams described herein for thermal insulation. The rigid foams can be used, for example, as an intermediate layer in composite elements or for filling hollow spaces of refrigerators and freezers, or refrigerated trailers. The foams may also find use in the construction industry or for thermal insulation of long-distance heating pipes and containers.

As such, the present invention also provides a composite article comprising rigid polyurethane foam as disclosed herein sandwiched between one or more facer substrates. In certain embodiments, the facer substrate may be plastic (such a polypropylene resin reinforced with continuous bi-directional glass fibers or a fiberglass reinforced polyester copolymer), paper, wood, or metal, such as aluminum. For example, in certain embodiments, the composite article may be a refrigeration apparatus such as a refrigerator, freezer, or cooler with an exterior metal shell and interior plastic liner. In certain embodiments, the refrigeration apparatus may be a trailer, and the composite article may include the polyurethane foams produced according to the present invention in sandwich composites for trailer floors.

It is currently believed that the particular isocyanate-reactive compositions described herein are capable of producing rigid foams that have a particular combination of properties that make them suitable for use in sandwich composites for trailer floors.

First, the rigid foams can have a thermal conductivity measured at 75° F. (23.9° C.) of less than 0.160 BTU-in/h-ft$^2$-° F., for foam from the core of 3-inch thick panels, as measured according to ASTM D1622-14 at an overall foam density of 1.90 to 2.20 lb/ft$^3$ (30.4 to 35.2 kg/m$^3$) even when the amount of HCFO used in the isocyanate-reactive composition is less than 15% by weight, based on the total weight of the isocyanate-reactive composition. Second, the isocyanate-reactive composition has a long shelf life. Here, when it is stated that the isocyanate-reactive composition has a "long" shelf life of it means that after storing the isocyanate-reactive composition for 6 days at 60° C., when the isocyanate-reactive composition is combined with the polyisocyanate, the gel time of the foam produced thereby remains within 10% of the initial gel time (the gel time of such a foam if produced immediately and not after storing the isocyanate-reactive composition for 6 days at 60°) even when the isocyanate-reactive composition comprises 1.5% by weight or more of water. In some cases, this initial gel time is 100 to 240 seconds, which can be ideally suited for trailer floor applications. Third, the rigid foams exhibit low shrinkage even at densities as low as 2.02 lb/ft$^3$, which means that the volume change of a free-rise density foam produced from the foam-forming compositions described herein is less than 14% after aging the foam for 4 weeks at ambient conditions of temperature and pressure (25° C. and 1 atm pressure). Fourth, the foams exhibit excellent adhesion to facer substrates typically used in the manufacture of composite elements for refrigerated trailer floor insulation, particularly aluminum facers. Fifth, when foamed without a press in the production of a trailer floor part, the foams may generate low enough pressure during foaming so that a top floor deflection of less than 0.5 inches is maintained. As used herein, "excellent adhesion" means that the rigid foam passes the Green Strength Adhesion Test that is described below.

Various aspects of the subject matter described herein are set out in the following numbered clauses:

Clause 1. An isocyanate-reactive composition comprising: (a) a polyol blend comprising: (1) 30 to 98% by weight, based on the total weight of the polyol blend, of a saccharide-initiated polyether polyol having an OH number of 200 to 600 mg KOH/g and a functionality of 4 to 6, (2) 1 to 40% by weight, based on the total weight of the polyol blend, of a polyalkylene oxide glycol having a functionality of 1.9 to 2.0 and an OH number of 20 to 120 mg KOH/g; and (3) 1 to 20% by weight, based on the total weight of the polyol blend, of an alkanolamine-initiated polyether polyol having an OH number of at least 500 mg KOH/g and a functionality of 2.5 to 4; (b) a blowing agent composition comprising: (1) a HCFO; and (2) a carbon dioxide generating chemical blowing agent; and (c) a tertiary amine catalyst composition.

Clause 2. The isocyanate-reactive composition of clause 1, wherein the saccharide-initiated polyether polyol is present in an amount of 40 to 98% by weight, 50 to 98% by weight, 60 to 90% by weight, or 70 to 90% by weight, based on the total weight of the polyol blend.

Clause 3. The isocyanate-reactive composition of clause 1 or clause 2, wherein the saccharide comprises sucrose, sorbitol, or maltitol.

Clause 4. The isocyanate-reactive composition of one of clause 1 to clause 3, wherein the saccharide-initiated polyether polyol is the reaction product of at least one alkylene oxide, such as propylene oxide and/or ethylene oxide, with one or more suitable initiator compounds in the presence of a suitable catalyst, in which the initiator compounds comprises one or more saccharides and one or more co-initiators comprising water, propylene glycol, glycerin, ethylene glycol, an ethanol amine, diethylene glycol, or a mixture thereof.

Clause 5. The isocyanate-reactive composition of one of clause 1 to clause 4, wherein the saccharide-initiated polyether polyol has an OH number of 300 to 550 mg KOH/g, 350 to 450 mg KOH/g, or 360 to 400 mg KOH/g, and/or a functionality of 4 to 5 or 4.0 to 4.5.

Clause 6. The isocyanate-reactive composition of one of clause 1 to clause 5, wherein the polyol blend comprises 1 to 20% by weight or 10 to 20% by weight, based on the total weight of the polyol blend, of the polyalkylene oxide glycol.

Clause 7. The isocyanate-reactive composition of one of clause 1 to clause 6, wherein the polyalkylene oxide glycol has a functionality of 1.98 to 2.00 and/or an OH number of 20 to 80 mg KOH/g, 20 to 40 mg KOH/g or 20 to 30 mg KOH/g.

Clause 8. The isocyanate-reactive composition of one of clause 1 to clause 7, wherein the polyalkylene oxide glycol has a number average molecular weight of 1000 to 5600 g/mol, 2800 to 5600 g/mol or 3700 to 5600 g/mol.

Clause 9. The isocyanate-reactive composition of one of clause 1 to clause 8, wherein the polyalkylene oxide glycol comprises the addition polymerization product of one or more alkylene oxides, such as ethylene oxide, propylene oxide, and/or butylene oxide, to one or more glycols, such as ethylene glycol, diethylene glycol, propylene glycol, and other oligomers of ethylene glycol and/or propylene glycol.

Clause 10. The isocyanate-reactive composition of one of clause 1 to clause 9, wherein the saccharide-initiated polyether polyol and the polyalkylene oxide glycol are present in the polyol blend at a weight ratio of at least 2:1, of 2:1 to 10:1, of 3:1 to 7:1 or of 4:1 to 6:1.

Clause 11. The isocyanate-reactive composition of one of clause 1 to clause 10, wherein the alkanolamine-initiated polyether polyol is the reaction product of at least one alkylene oxide, such as propylene oxide, butylene oxide, styrene oxide, epichlorohydrin, or a mixture of any two or more thereof, with one or more suitable initiator compounds comprising an alkanolamine represented by the formula:

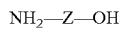

NH$_2$—Z—OH in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms, such as those represented by the formula:

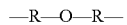

—R—O—R— where each R represents a hydrocarbon radical having 2 to 3 carbon atoms, such as monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, or a mixture of any two or more thereof.

Clause 12. The isocyanate-reactive composition of one of clause 1 to clause 11, wherein the alkanolamine-initiated polyether polyol has an OH number of 500 to 900 mg KOH/g, 600 to 800 mg KOH/g, or 680 to 720 mg KOH/g, and/or a functionality of 2.5 to 3.5.

Clause 13. The isocyanate-reactive composition of one of clause 1 to clause 12, wherein the alkanolamine-initiated polyether polyol is present in an amount of 1 to 10% by weight or 2 to 10% by weight, based upon the total weight of the polyol blend.

Clause 14. The isocyanate-reactive composition of one of clause 1 to clause 13, wherein the saccharide-initiated polyether polyol and the alkanolamine-initiated polyether polyol are present in the polyol blend at a weight ratio of at least 5:1, of 10:1 to 25:1, or of 15:1 to 25:1.

Clause 15. The isocyanate-reactive composition of one of clause 1 to clause 14, wherein the polyalkylene oxide glycol and the alkanolamine-initiated polyether polyol are present in the polyol blend in a weight ratio of at least 1:1, of 1:1 to 10:1, of 1:1 to 5:1, or of 2:1 to 4:1.

Clause 16. The isocyanate-reactive composition of one of clause 1 to clause 15, wherein the polyol blend further comprises an aliphatic triol-initiated polyether polyol having an OH number of 100 to 500 mg KOH/g, 200 to 400 mg KOH/g, 200 to 300 mg KOH/g, 200 to 250 mg KOH/g, 230 to 250 mg KOH/g or 233 to 243 mg KOH/g, and/or a functionality of greater than 2 to 4, 2.5 to 3.5, or 3.0.

Clause 17. The isocyanate-reactive composition of one of clause 1 to clause 16, wherein the polyol blend has a weighted average functionality of 4 to 6, of 4.5 to 4.5, or of 4.5 to 5.0, and/or a weighted average hydroxyl number of 300 to 500 mg KOH/g, 300 to 400 mg KOH/g, or 320 to 360 mg KOH/g, and/or a weighted average molecular weight of greater than 800 to 1600 g/mol, 1000 to 1400 g/mol or 1200 to 1300 g/mol.

Clause 18. The isocyanate-reactive composition of one of clause 1 to clause 17, wherein the HCFO comprises 1-chloro-3,3,3-trifluoropropene (HCFO-1233zd, E and/or Z isomer), 2-chloro-3,3,3-trifluoropropene (HCFO-1233xf), HCFO1223, 1,2-dichloro-1,2-difluoroethene (E and/or Z isomer), 3,3-dichloro-3-fluoropropene, 2-chloro-1,1,1,4,4,4-hexafluorobutene-2 (E and/or Z isomer), 2-chloro-1,1,1,3,4,4,4-heptafluorobutene-2 (E and/or Z isomer), or a mixture of any two or more thereof.

Clause 19. The isocyanate-reactive composition of one of clause 1 to clause 18, wherein the boiling point, at atmospheric pressure, of the HCFO is at least −25° C., at least −20° C., or at least −19° C., and 40° C. or less, 35° C. or less, or 33° C. or less, such as where the HCFO has a boiling point, at atmospheric pressure, of −25° C. to 40° C., −20° C. to 35° C., or −19° C. to 33° C.

Clause 20. The isocyanate-reactive composition of one of clause 1 to clause 19, wherein the HCFO is present in an amount of at least 10% by weight, 10 to 30% by weight, or 10 to 20% by weight, based on the total weight of the isocyanate-reactive composition.

Clause 21. The isocyanate-reactive composition of one of clause 1 to clause 20, wherein the isocyanate-reactive composition further comprises one or more other halogenated blowing agents, such as CFCs, HCFCs, and/or HFCs, and/or comprises one or more hydrocarbon blowing agents, such as butane, n-pentane, cyclopentane, hexane, and/or isopentane (i.e. 2-methylbutane).

Clause 22. The isocyanate-reactive composition of one of clause 1 to clause 21, wherein the carbon dioxide generating chemical blowing agent comprises water and/or a formate-blocked amine.

Clause 23. The isocyanate-reactive composition of one of clause 1 to clause 22, wherein the carbon dioxide generating chemical blowing agent is present in an amount of 0.5 to 5.0% by weight, 1 to 4% by weight, 1.0 to 3.0% by weight, or 2.0 to 3.0% by weight, based on the total weight of the isocyanate-reactive composition.

Clause 24. The isocyanate-reactive composition of one of clause 1 to clause 23, wherein the HCFO and the carbon dioxide generating chemical blowing agent are present in an amount of at least 90% by weight, at least 95% by weight, or at least 99% by weight, based on the total weight of the blowing agent composition.

Clause 25. The isocyanate-reactive composition of one of clause 1 to clause 24, wherein the HCFO and a carbon dioxide generating chemical blowing agent are present in the blowing agent composition at a weight ratio of at least 2:1, at least 4:1, 4:1 to 10:1, or 6:1 to 10:1.

Clause 26. The isocyanate-reactive composition of one of clause 1 to clause 25, wherein the isocyanate-reactive composition further comprises a surfactant, such as a polysiloxane-polyalkyene-block copolymer, such as a polyether-modified polysiloxane, a polyethylene glycol ethers of long chain alcohol, tertiary amine or an alkanolamine salt of a long chain alkyl acid sulfate ester, alkylsulfonic ester, or alkylarylsulfonic acid.

Clause 27. The isocyanate-reactive composition of one of clause 1 to clause 26, wherein the tertiary amine catalyst composition comprises a morpholine and/or an imidazole, such as where the tertiary amine catalyst composition comprises: (i) 80 to 99% by weight, 90 to 99% by weight, 95 to 98% by weight or 97 to 98% by weight, based on the total weight of the tertiary amine catalyst composition, of a morpholine; and (ii) 1 to 20% by weight, 1 to 10% by weight, 2 to 5% by weight, or 2 to 3% by weight, based on the total weight of the tertiary amine catalyst composition, of an imidazole, such as where the morpholine catalyst comprises dimorpholinodiethylether, dimorpholinodimethylether N-ethylmorpholine, N-methylmorpholine, or a mixture of any two or more thereof, and the imidazole catalyst comprises imidazole, n-methylimidazole, 1,2-dimethylimidazole, or a mixture of any two or more thereof, such as where the morpholine catalyst comprises a mixture of dimorpholinodiethylether and N-methylmorpholine, wherein the dimorpholinodiethylether is present in an amount of 30 to 80% by weight or 40 to 80% by weight and N-methylmorpholine is present in an amount of 20 to 70% by weight or 20 to 60% by weight, based on the total weight of morpholine catalyst.

Clause 28. A rigid polyurethane foam-forming composition comprising: (a) a polyisocyanate; and (b) the isocyanate-reactive composition of one of clause 1 to clause 27.

Clause 29. The rigid polyurethane foam-forming of clause 28, wherein the polyisocyanate comprises an aromatic, aliphatic, or cycloaliphatic polyisocyanate, or a mixture of any two or more thereof, such as a methylene-bridged polyphenyl polyisocyanate and/or a prepolymer of methylene-bridged polyphenyl polyisocyanates having an average functionality of 1.8 to 3.5, or 2.0 to 3.1, isocyanate moieties per molecule, and an NCO content of from 25 to 32 weight percent.

Clause 30. A rigid polyurethane foam produced from the rigid polyurethane-foam forming composition of clause 29.

Clause 31. A process for producing a rigid polyurethane foam comprising mixing, at an isocyanate index of 90 to 140 or 110 to 130, an organic polyisocyanate with an isocyanate-reactive composition of one of clause 1 to clause 27.

Clause 32. The process of clause 31, wherein the mixture is injected or poured into a mold having the temperature of 20 to 70° C. or 35 to 60° C.

Clause 33. A composite article comprising a rigid polyurethane foam that is the reaction product of the rigid polyurethane foam-forming composition of clause 28 or clause 29, or that is produced by the process of clause 31 or clause 32, sandwiched between one or more facer substrates, wherein the facer substrate comprises plastic, such as a polypropylene resin reinforced with continuous bi-directional glass fibers or a fiberglass reinforced polyester copolymer, paper, wood, or metal, such as aluminum.

Clause 34. The composite article of clause 33, wherein the composite article is embodied as a refrigeration apparatus.

Clause 35. The composite article of clause 34, wherein the refrigeration apparatus comprises a trailer, and the composite article is a sandwich composite for a trailer floor.

The non-limiting and non-exhaustive examples that follow are intended to further describe various non-limiting and non-exhaustive embodiments without restricting the scope of the embodiments described in this specification.

Examples

Foam-forming compositions were prepared using the ingredients and amounts (in parts by weight) set forth in Table 1. The following materials were used:

POLYOL 1: a sucrose, glycerin, propylene glycol, and water-initiated polyether polyol having an OH number of 398-422 mg KOH/g and an average functionality of 4.3;

POLYOL 2: a sucrose and water-initiated polyether polyol having an OH number of 370-390 mg KOH/g and an average functionality of 5.33;

POLYOL 3: a glycerin-initiated propylene oxide-based triol having an OH number of 445-495 mg KOH/g;

POLYOL 4: a 4,000 molecular weight polypropylene oxide based diol, hydroxyl number 26-30;

POLYOL 5: a glycerin-initiated polypropylene oxide-based triol having an OH number of 233-243 mg KOH/g;

POLYOL 6: a polypropylene oxide based diol, hydroxyl number 107.4-115.4 (equivalent weight 486-522);

POLYOL 7: a sucrose/water-initiated polyether polyol having an OH number of 450-490 mg KOH/g and an average functionality of 5.52;

POLYOL 8: an aromatic amine-initiated polyether tetrol, hydroxyl number 378-398 mg KOH/g;

POLYOL 9: an aromatic amine-initiated polyether tetrol, hydroxyl number 350-370 mg KOH/g;

POLYOL 10: an aromatic polyester polyol having an OH number of 230-250 mg KOH/g and a viscosity of 2,000-4,000 mPa·s at 25° C.;

POLYOL 11: a monoethanolamine-initiated polyether polyol having an OH number of 685 to 715, a functionality of 3, and a nitrogen content of 5.8% by weight, prepared by propoxylating monoethanolamine;

SURF: TEGOSTAB® B-8499;

CAT 1: 2,2'-dimorpholinodiethylether (JEFFCAT® DMDEE from Huntsman);

CAT 2: N-methylmorpholine catalyst (JEFFCAT® NMM from Huntsman);

CAT 3: 1,2-dimethylimidazole (DABCO® 2040 or 2041 from Evonik);

CAT 4: (2-Hydroxypropyl)trimethylammonium formate (DABCO® TMR-2 from Evonik);

FR: Tris (2-chloroisopropyl) phosphate (Fyrol™ PCF from ICL Industrial Products);

HCFO: trans-1-Chloro-3,3,3-trifluoropropene (Solstice® LBA from Honeywell);

ISO: polymeric diphenylmethane diisocyanate (pMDI); NCO weight 31.5%; viscosity 200 mPa·s @ 25° C.; equivalent weight 133; functionality 2.8 (MONDUR® MR from Covestro LLC);

TABLE 1

| Ingredient | 1 | 2 | 3 | 4 | 5 | 6 | 7 |
|---|---|---|---|---|---|---|---|
| POLYOL 1 | 52.08 | 52.37 | — | — | — | — | — |
| POLYOL 2 | — | — | — | 26.19 | — | — | 34.91 |
| POLYOL 3 | — | — | — | — | — | 17.46 | — |
| POLYOL 4 | 18.01 | — | — | — | — | — | — |
| POLYOL 5 | — | 10.04 | 10.04 | 10.04 | 10.04 | 10.04 | 10.04 |
| POLYOL 6 | — | 9.02 | 9.02 | 9.02 | 9.02 | 9.02 | 9.02 |
| POLYOL 7 | — | — | 52.37 | 26.18 | 26.19 | — | — |
| POLYOL 8 | — | — | — | — | 26.18 | — | — |
| POLYOL 9 | — | — | — | — | — | 34.91 | — |
| POLYOL 10 | — | — | — | — | — | — | 17.46 |
| SURF | 1.93 | 1.91 | 1.91 | 1.91 | 1.91 | 1.91 | 1.91 |
| CAT 1 | 2.03 | 2.01 | 2.01 | 2.01 | 2.01 | 2.01 | 2.01 |
| CAT 2 | 0.92 | 0.38 | 0.38 | 0.38 | 0.38 | 0.38 | 0.38 |
| CAT 3 | 0.10 | — | — | — | — | — | — |

TABLE 1-continued

| | | | | | | | |
|---|---|---|---|---|---|---|---|
| FR | 8.14 | 8.04 | 8.04 | 8.04 | 8.04 | 8.04 | 8.04 |
| Water | 2.34 | 2.41 | 2.41 | 2.41 | 2.41 | 2.41 | 2.41 |
| HCFO | 14.45 | 13.82 | 13.82 | 13.82 | 13.82 | 13.82 | 13.82 |
| | | | | | | | |
| Total | 100.00 | 100.00 | 100.00 | 100.00 | 100.00 | 100.00 | 100.00 |
| ISO | 100.00 | 118.00 | 127.00 | 120.00 | 121.00 | 117.00 | 104.00 |

| Ingredient | 8 | 9 | 10 | 11 | 12 | 13 | 14 |
|---|---|---|---|---|---|---|---|
| POLYOL 1 | 46.09 | 46.03 | 59.68 | — | — | — | — |
| POLYOL 2 | — | — | — | 66.55 | 53.00 | 60.00 | 52.21 |
| POLYOL 3 | — | — | — | — | — | — | — |
| POLYOL 4 | 17.22 | 17.18 | — | — | 10.00 | 6.00 | 9.85 |
| POLYOL 11 | 5.84 | 5.83 | 5.04 | — | 3.00 | — | 2.96 |
| SURF | 1.85 | 1.84 | 1.76 | 1.00 | 1.00 | 1.00 | 1.00 |
| CAT 1 | 1.95 | 1.94 | 2.27 | 2.00 | 2.50 | 2.50 | 2.51 |
| CAT 2 | 0.88 | 0.87 | 0.88 | 0.90 | 0.90 | 0.90 | 0.91 |
| CAT 3 | 0.10 | 0.10 | 0.09 | 0.10 | 0.05 | 0.05 | 0.05 |
| CAT 4 | — | 0.19 | — | — | — | — | — |
| FR | 8.75 | 8.74 | 11.33 | 11.75 | 11.70 | 11.70 | 11.76 |
| Water | 2.24 | 2.23 | 2.08 | 2.40 | 2.25 | 2.30 | 2.36 |
| HCFO | 15.08 | 15.05 | 16.87 | 15.30 | 15.60 | 15.55 | 16.39 |
| | | | | | | | |
| Total | 100.00 | 100.00 | 100.00 | 100.00 | 100.00 | 100.00 | 100.00 |
| ISO | 100.00 | 102.00 | 100.00 | 109.00 | 104.00 | 106.00 | 105.00 |

For each of the Examples, the polyols, catalysts, surfactant, flame retardant, water, and HCFO were combined in the amounts indicated in Table 1. All foams were prepared in a laboratory using a small scale laboratory press. Successful laboratory results were prepared using a Hennecke HK-100 high-pressure foam machine. The liquid output was maintained at a constant 21° C. for Polyol side and 27° C. for Isocyanate side with an output range of 454 to 653 grams/second with a pour pressure of 103 bar. The minimum fill density was determined from foaming 3 panels poured into a temperature controlled mold (29.4° C.) having dimensions—8 inches by 78.75 inches by 3 inches (20.3 cm×200 cm×7.6 cm) that didn't fill the mold entirely, then linear regression was used to determine a calculated minimum panel mass value. After the minimum fill density was determined, then foam was packed to obtain desired density of approximate 8 to 15 percent over the minimum fill density. The foam was sandwiched between one aluminum facer and one plastic facer. Foams were held in the mold at 29.4° C. for 180 to 240 minutes before de-molding. Overall density for each of the foams was between 2.01 and 2.17 lb/ft$^3$ (32.2 to 34.8 kg/m$^3$), measured according to ASTM D1622-14.

The foams were tested for various properties and the results are set forth in Table 2. For k-factor, the foam was considered a "Pass" if it had a thermal conductivity measured at 75° F. (23.9° C.) of less than 0.160 BTU-in/h-ft$^2$-° F., for foam from the core of 3-inch thick panels, as measured according to ASTM C518-17. For shelf life, the foam was considered a "Pass" if the gel time of the foam after storing the isocyanate-reactive composition for 6 days at 60° C. was within 10% of the initial gel time (the gel time of such a foam if produced immediately and not after storing the isocyanate-reactive composition for 6 days at 60°). For dimensional stability, the foam was considered a "Pass" if the volume change of a free-rise density foam was less than 14% after aging the foam for 4 weeks at ambient conditions of temperature and pressure (25° C. and 1 atm pressure). For foam pressure, the foam was considered a "Pass" if the pressure generated was less than 1.0 lb/in$^2$, in some cases, less than 0.95 lb/in$^2$, or even less than 0.85 lb/in$^2$, measured as described in paragraph [00111] of U.S. patent application Ser. No. 16/296,872. For adhesion, the foam was considered a "Pass" if an aluminum facer stuck to the foam and pulled tape away from the press, when measured according to the Green Strength Adhesion Test described below. For adhesion, the foam was considered a "Fail" if the aluminum facer delaminated from the foam and stayed taped to the press, when measured according the Green Strength Adhesion Test.

The Green Strength Adhesion Test was as follows: A vertical lab press with frame inside dimensions of 26 inches high, 13 inches wide and 3 inches thick was heated to 85° F. 1 inch wide masking tape was applied to the entire perimeter of a 0.04 inch thick aluminum facer on the actuating side of the press with ½" overlap onto the facer and ½" overlap onto the press. This facer replaces one side of the frame measuring 26 inches high and 13 inches wide. A mold release (1894-EX-S from Solar Corp.) was applied to the remainder of the frame and allowed to dry for at least 2 minutes. The frame was closed inside the press and the desired amount of foam-forming composition was poured into the mold in an amount targeted to achieve a desired density. The top of the mold was closed and clamped before the foam reached the top of the mold. After 20 minutes, the frame part was held in place by hand while opening the actuating side of the press.

TABLE 2

| Example | K-factor | Dimensional Stability | Adhesion | Foam Pressure (lb/in$^2$) | Shelf-life | Comments |
|---|---|---|---|---|---|---|
| 1 | Pass | Fail | n/r | Pass (0.64) | n/r | High Shrinkage |
| 2 | Pass | Pass | Fail | Pass (0.60) | Pass | Friable foam. Higher density than desired. |

TABLE 2-continued

| Example | K-factor | Dimensional Stability | Adhesion | Foam Pressure (lb/in$^2$) | Shelf-life | Comments |
|---|---|---|---|---|---|---|
| 3 | Pass | Fail | Fail | n/r | n/r | Friable foam Higher density than desired. |
| 4 | Pass | Fail | Fail | n/r | n/r | Friable foam Higher density than desired. |
| 5 | Pass | Fail | Fail | n/r | n/r | Friable foam Higher density than desired. |
| 6 | Pass | Fail | Fail | n/r | n/r | Friable foam Higher density than desired. |
| 7 | Pass | Fail | Fail | n/r | n/r | Friable foam Higher density than desired. |
| 8 | Pass | Pass | n/r | Pass (0.93) | n/r | — |
| 9 | Pass | Pass | n/r | Pass (0.93) | n/r | — |
| 10 | Pass | Pass | n/r | Pass (0.93) | n/r | Higher OH/NCO ratio than desired. |
| 11 | Pass | Pass | Fail | Fail | n/r | Friable foam |
| 12 | Pass | Pass | Pass | Pass (0.80) | n/r | — |
| 13 | Pass | Pass | Fail | Pass (0.69) | n/r | — |
| 14 | Pass | Pass | Pass | Pass (0.67-0.80) | Pass | — |

As is apparent from Table 2, Inventive Examples 8, 9, 12 and 14 all passed dimensional stability testing and exhibited acceptable foam pressure. Inventive examples 12 and 14 were also adhesion tested and passed (although not tested, it is also believed that Examples 8 and 9 would have passed adhesion testing). Example 14 was also shelf-life tested and passed (it is believed that Examples 8, 9 and 12 also would have passed shelf-life testing).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-reactive composition comprising:
(a) a polyol blend comprising:
(1) 30 to 98% by weight, based on the total weight of the polyol blend, of a saccharide-initiated polyether polyol having an OH number of 200 to 600 mg KOH/g and a functionality of 4 to 6,
(2) 1 to 40% by weight, based on the total weight of the polyol blend, of a polyalkylene oxide glycol having a functionality of 1.9 to 2.0 and an OH number of 20 to 120 mg KOH/g;
(3) 1 to 20% by weight, based on the total weight of the polyol blend, of an alkanolamine-initiated polyether polyol having an OH number of at least 500 mg KOH/g and a functionality of 2.5 to 4;
(b) a blowing agent composition comprising:
(1) a hydrochlorofluoroolefin; and
(2) a carbon dioxide generating chemical blowing agent; and
(c) a tertiary amine catalyst composition.

2. The isocyanate-reactive composition of claim 1, wherein the tertiary amine catalyst composition comprises:
(1) 80 to 99% by weight, based on the total weight of the tertiary amine catalyst composition, of a morpholine; and
(2) 1 to 20% by weight, based on the total weight of the tertiary amine catalyst composition, of an imidazole.

3. The isocyanate-reactive composition of claim 2, wherein the morpholine comprises:
(A) 40 to 80% by weight, based on the total weight of the morpholine, of dimorpholinodiethylether; and
(B) 20 to 60% by weight, based on the total weight of the morpholine, of N-methylmorpholine.

4. The isocyanate-reactive composition of claim 1, wherein the saccharide-initiated polyether polyol is present in an amount of at least 70% by weight, based on the total weight of the polyol blend.

5. The isocyanate-reactive composition of claim 1, wherein the alkanolamine-initiated polyether polyol has an OH number of 600 to 800 mg KOH/g and a functionality of 2.5 to 3.5.

6. The isocyanate-reactive composition of claim 1, wherein the saccharide-initiated polyether polyol and the polyalkylene oxide glycol are present in the polyol blend at a weight ratio of 2:1 to 10:1.

7. The isocyanate-reactive composition of claim 6, wherein the saccharide-initiated polyether polyol and the polyalkylene oxide glycol are present in the polyol blend at a weight ratio of 3:1 to 7:1.

8. The isocyanate-reactive composition of claim 1, wherein the saccharide-initiated polyether polyol and the alkanolamine-initiated polyether polyol are present in the polyol blend at a weight ratio of at least 5:1.

9. The isocyanate-reactive composition of claim 8, wherein the saccharide-initiated polyether polyol and the alkanolamine-initiated polyether polyol are present in the polyol blend at a weight ratio of 10:1 to 25:1.

10. The isocyanate-reactive composition of claim 8, wherein the polyalkylene oxide glycol and the alkanolamine-initiated polyether polyol are present in the polyol blend in a weight ratio of at least 1:1.

11. The isocyanate-reactive composition of claim 10, wherein the polyalkylene oxide glycol and the alkanolamine-initiated polyether polyol are present in the polyol blend in a weight ratio of 1:1 to 5:1.

12. The isocyanate-reactive composition of claim 1, wherein the hydrochlorofluoroolefin comprises trans-1,1,1-trifluoro-3-chloropropene.

13. The isocyanate-reactive composition of claim 1, wherein the hydrochlorofluoroolefin and the carbon dioxide generating chemical blowing agent are present in an amount of at least 90% by weight, based on the total weight of the blowing agent composition.

14. A composite article comprising a rigid polyurethane foam sandwiched between facer substrates, wherein the rigid polyurethane foam comprises the reaction product of a reaction mixture comprising (a) a polyisocyanate, (b) a polyol blend, (c) a blowing agent composition comprising: (1) a hydrochlorofluoroolefin; and (2) a carbon dioxide generating chemical blowing agent; and (d) a tertiary amine catalyst composition, wherein the polyol blend comprises:
   (1) 40 to 98% by weight, based on the total weight of the polyol blend, of a saccharide-initiated polyether polyol having an OH number of 200 to 600 mg KOH/g and a functionality of 4 to 6;
   (2) 1 to 40% by weight, based on the total weight of the polyol blend, of a polyalkylene oxide glycol having a functionality of 1.9 to 2.0 and an OH number of 20 to 120 mg KOH/g; and
   (3) 1 to 20% by weight, based on the total weight of the polyol blend, of an alkanolamine-initiated polyether polyol having an OH number of at least 500 mg KOH/g and a functionality of 2.5 to 4.

15. The composite article of claim 14, wherein the hydrochlorofluoroolefin and the carbon dioxide generating chemical blowing agent are present in an amount of at least 90% by weight, based on the total weight of the blowing agent composition.

16. A rigid polyurethane foam-forming composition comprising:
   (a) a polyisocyanate;
   (b) a polyol blend comprising:
      (1) 40 to 98% by weight, based on the total weight of the polyol blend, of a saccharide-initiated polyether polyol having an OH number of 200 to 600 mg KOH/g and a functionality of 4 to 6, or
      (2) 1 to 40% by weight, based on the total weight of the polyol blend, of a polyalkylene oxide glycol having a functionality of 1.9 to 2.0 and an OH number of 20 to 120 mg KOH/g; and
      (3) 1 to 20% by weight, based on the total weight of the polyol blend, of an alkanolamine-initiated polyether polyol having an OH number of at least 500 mg KOH/g and a functionality of 2.5 to 4;
   (c) a blowing agent composition comprising:
      (1) a hydrochlorofluoroolefin; and
      (2) a carbon dioxide generating chemical blowing agent; and
   (d) a tertiary amine catalyst composition.

17. A rigid polyurethane foam prepared from the rigid polyurethane foam-forming composition of claim 16.

18. The rigid polyurethane foam-forming composition of claim 16, wherein the hydrochlorofluoroolefin and the carbon dioxide generating chemical blowing agent are present in an amount of at least 90% by weight, based on the total weight of the blowing agent composition.

19. A method of making a rigid polyurethane foam, comprising mixing the isocyanate-reactive composition of claim 1 with a polyisocyanate at an isocyanate index of 90 to 150 to form a reaction mixture.

20. A rigid polyurethane foam prepared by the method of claim 19.

* * * * *